United States Patent [19]

Ahrens

[11] 3,789,260

[45] Jan. 29, 1974

[54] HIGH VOLTAGE PROTECTION CIRCUIT

[75] Inventor: Paul Raymond Ahrens, Indianapolis, Ind.

[73] Assignee: RCA Corporation, New York, N.Y.

[22] Filed: Mar. 23, 1973

[21] Appl. No.: 344,065

Related U.S. Application Data

[63] Continuation of Ser. No. 121,250, March 29, 1971, abandoned.

[52] U.S. Cl. ................................ 315/22, 315/27 TD

[51] Int. Cl. ................................ H01j 29/70

[58] Field of Search ....... 315/27 TD, 28, 29, 22, 20; 178/DIG. 11, 7.5 R

[56] References Cited

UNITED STATES PATENTS 3,611,002 10/1971 Wedam ................................ 315/22

3,629,644 12/1971 Waybright ................................ 315/22

*Primary Examiner*—Carl D. Quarforth

*Assistant Examiner*—J. M. Potenza

*Attorney, Agent, or Firm*—Eugene M. Whitacre; Charles I. Brodsky

[57] ABSTRACT

Loss of high voltage regulation in a television receiver can cause an increase in the ultor voltage developed for its picture tube and an increase in the possibility of X-radiation. The described circuit senses the loss of such regulation by detecting high voltage increases beyond a predetermined value and by changing the frequency of the horizontal oscillator, in response, to render the reproduced picture unviewable.

7 Claims, 1 Drawing Figure

PATENTED JAN 29 1974 3,789,260
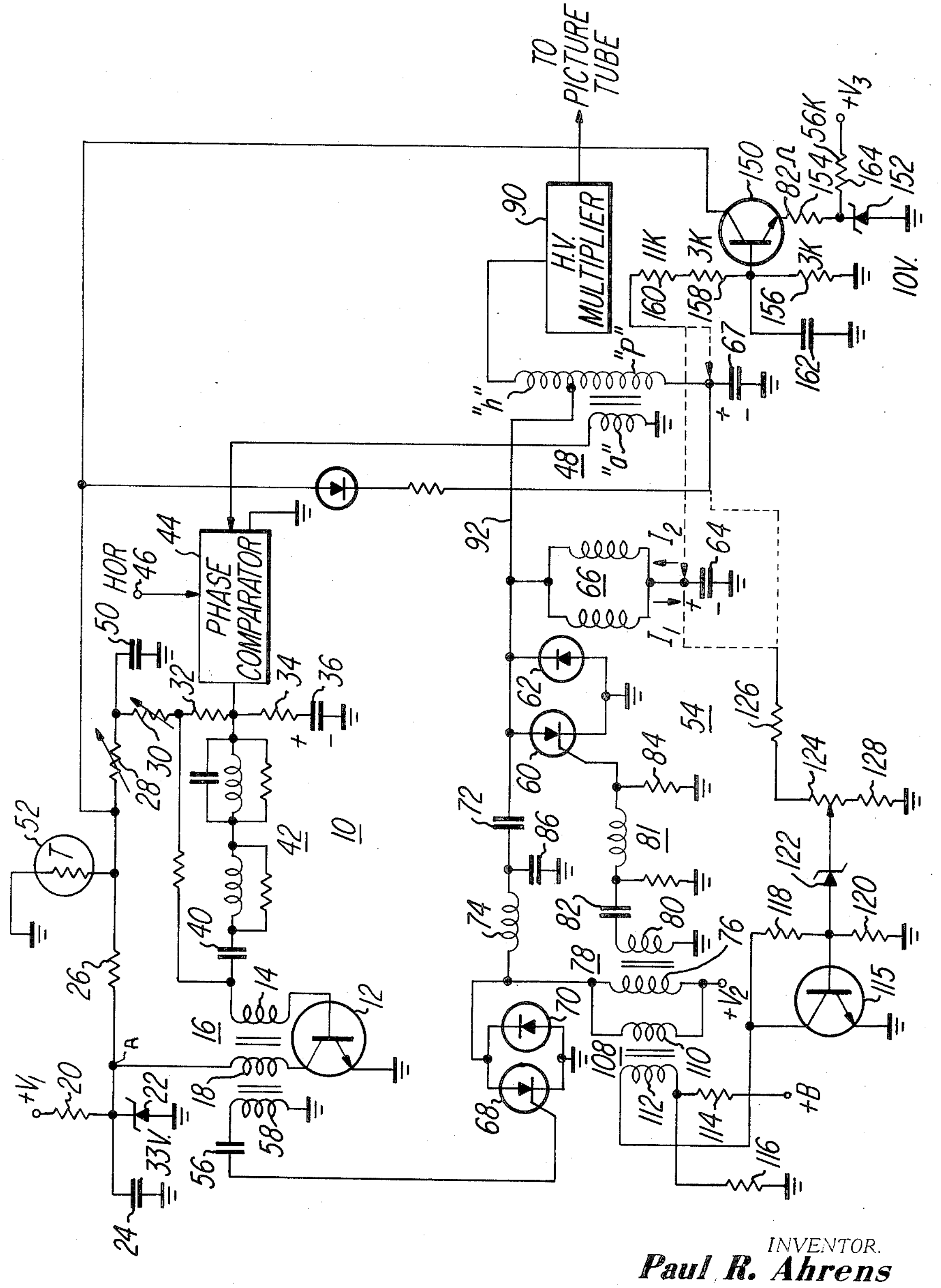
INVENTOR.
Paul R. Ahrens
BY
Charles Brodsky
ATTORNEY

HIGH VOLTAGE PROTECTION CIRCUIT

This is a continuation of application Ser. No. 121,250, filed Mar. 29, 1971, now abandoned.

FIELD OF THE INVENTION

This invention relates to television receivers, in general, and to its horizontal deflection output circuitry which develops the high voltage necessary for image reproduction, in particular.

SUMMARY OF THE INVENTION

Such output circuitry oftentimes employs a regulator system to stabilize the high voltage developed for the ultor electrode of the cathode-ray kinescope. Where loss of stabilization occurs—through a fault in a regulator transistor or in its coupling transformer, for example—the ultor voltage could rise to a level at which the impacting high energy electrons of the picture tube could destroy its phosphor face and could create an X-radiation hazard. These effects are possible both for those receivers which use a step-up transformer and high voltage rectifier to develop the ultor voltage from the horizontal deflection retrace pulse, as well as for those which use a multiplier having internal rectification capabilities to develop the needed voltage.

As will become clear hereinafter, the circuit of the present invention senses a particular operating condition in the receiver as indicative of the functioning of the high voltage regulator. During proper functioning of the regulator system, the circuit provides a zero control effect; but, upon detecting a voltage change indicating a malfunction in the regulator, the circuit responds to provide a control signal which changes the frequency of the horizontal oscillator and renders the reproduced picture unviewable. One preferred embodiment of the invention will be seen to employ a transistor and zener diode reference to detect high voltage increases in much the same way that an illustrated regulator network detects high voltage increases across a horizontal deflection yoke capacitor as picture tube beam current decreases. In accordance with the invention, however, the transistor arrangement only becomes operative to provide its desired control when the direct voltage across such capacitor, for example, increases to a level which can arise only during a failure in the regulator system.

As such, the described configuration can supplement the protection afforded by the high voltage hold-down circuit disclosed in the pending United States application, Ser. No. 103,713, filed Jan. 4, 1971 (RCA 64,214). That application described a circuit which changed the operating frequency of the horizontal oscillator when the peak-to-peak signal applied to its high voltage multiplier exceeded a prescribed limit. The diode-resistor combination there described as adjusting the oscillator frequency to stabilize the high voltage can be used in conjunction with the transistor arrangement of the preferred embodiment described below, to afford an increased protection against the possible dangers associated with rising high voltages.

BRIEF DESCRIPTION OF THE DRAWING

These and other advantages of the present invention will be more clearly understood from a consideration of the single FIGURE of the drawing showing, in schematic form, a horizontal deflection circuit for a television receiver including a protection arrangement constructed in accordance with the invention.

DETAILED DESCRIPTION OF THE DRAWING

In the drawing, the horizontal oscillator stage of the receiver 10 includes a transistor 12 having a grounded emitter electrode and a base electrode coupled to a first winding 14 of a transformer 16. A secondary winding 18 of transformer 16 couples the collector electrode of transistor 12 to a terminal point A, at which a relatively constant voltage is provided by means of a resistor 20 and voltage regulating zener diode 22 serially coupled between a first source of energizing potential ($+V_1$) and ground. Also coupled to the terminal point A is a filter capacitor 24 bypassing the zener diode 22, and a series circuit including resistors 26, 28, 30, 32, and 34 to charge a capacitor 36 in the polarity shown for developing a turn-on voltage for the transistor 12. To this end—and to establish a blocking oscillator function—the junction between resistors 30 and 32 is coupled by a further resistor 38, to the end of winding 14 remote from transistor 12, while the junction between resistors 32 and 34 is coupled to the same end of that winding 14 by a capacitor 40 and a waveshaping network 42.

The junction between resistors 32 and 34 is also coupled to the output terminal of a phase comparator 44 (shown in block diagram form), which serves to synchronize the frequency of the oscillator 10 to the frequency of the horizontal synchronizing pulses of the received television signal. As shown, the comparator 44 is supplied with the horizontal rate pulse recovered by a synchronizing separator circuit of the receiver at terminal 46 and, also, with a signal developed at a secondary winding *a* of a horizontal output transformer 48 which is related in time to the operation of the oscillator 10. Resistor 28 is shown as being adjustable to serve as the horizontal hold control of the television receiver, to finely vary the exact frequency of the oscillator 10 by determining the instant at which transistor 12 will reach its turn-on voltage. Resistor 30 is also adjustable to limit the amount of frequency change possible by adjustment of resistor 28, and is used to prevent the oscillator from operating at a frequency which is too high for the proper operation of the horizontal output circuitry described below. The junction of these two resistors is coupled to ground by an added capacitor 50, while the junction of resistors 26 and 28 is coupled by a thermistor 52 to ground. Such thermistor 52 operates in conjunction with the resistor 26 as a temperature sensitive voltage divider network to vary the base electrode voltage of transistor 12 in a direction to compensate for variations in oscillator frequency as are caused by temperature changes which affect the operating characteristics of transistor 12.

As will be readily appreciated, collector electrode pulses which are coupled into the base electrode circuit of transistor 12 by transformer 16 cause the oscillator transistor 12 to be driven to cutoff. While transistor 12 is thus cut off, the capacitor 40 discharges through the horizontal hold control resistor 28 and its associated circuitry to the slightly positive "turn-on" potential of transistor 12. The resulting pulse of current which appears in the collector electrode circuit is then coupled back into the base electrode circuit through transformer 16 to initiate oscillator saturation.

The horizontal deflection circuit of the receiver is represented in the drawing by the reference numeral 54, and is provided with drive signals by means of a capacitor 56 coupled to a third winding 58 of the transformer 16. Such deflection circuit is shown of the type described in U.S. Pat. No. 3,452,244 as including a bidirectionally conductive trace and retrace switching means, each including a silicon controlled rectifier (SCR) together with a parallel coupled diode. The trace switching means—SCR 60, diode 62—couples an S-shaping capacitor 64 across a horizontal deflection winding yoke 66 during the trace portion of each deflection cycle while the retrace switching means—SCR 68, diode 70—couples the capacitor 64 across the yoke 66 during the retrace portion. A capacitor 72 and a commutating inductor 74 are coupled between the trace and retrace switching means, with a second source of energizing potential (+$V_2$) being coupled to the junction of the retrace means with the inductor 74 by way of a relatively large inductor 76. As shown, the inductor 76 comprises one winding of a transformer 78, having a second winding 80 coupled to the gate electrode of SCR 60 by a waveshaping network 81 including a capacitor 82 and a resistor 84. As will be seen below, the voltage pulse developed across transformer winding 76 during the charging of capacitor 72 is used to forward bias the gate electrode of SCR 60—enabling this component to conduct at the proper time—whereas the voltage pulse developed across transformer winding 58 in the horizontal oscillator 10 is used to forward bias the gate electrode of SCR 68—thereby releasing a charge previously stored on capacitor 72 into the commutating inductor 74. Lastly, a capacitor 86 couples the junction of capacitor 72 and inductor 74 to ground to provide the necessary energy storage and timing control with the components 64, 72 and 74.

As is more fully described in the above-mentioned patent, the complete horizontal deflection yoke current cycle occurs as a sequence of individual events involving different modes of horizontal circuit operation. Thus, as the trace interval of each horizontal deflection cycle is initiated, current flowing in the yoke 66 is at a maximum value due to prior circuit action involving resonant energy exchanges between inductors 74, 76 and 80, capacitors 72 and 86, and the deflection yoke 66. Yoke current at this time flows in a direction illustrated by the arrow $I_1$, and through the trace diode 62 to impress a voltage of the indicated polarity across capacitor 64.

At the mid-point of the horizontal trace (the center of the scanned raster), the magnitude of the current $I_1$ decreases to zero and SCR 60 is triggered into conduction by the transformer winding 80 and the circuit 81. At this time, capacitor 64 discharges into the yoke 66—the current flow being indicated by the arrow $I_2$—to reverse bias the diode 62 but to simultaneously forward-bias the trace SCR 60.

During the latter portion of the trace interval and prior to retrace, a pulse is developed across transformer winding 58 in the horizontal oscillator 10, and is applied to the gate electrode of SCR 68 to render it conductive and initiate the commutating portion of the deflection cycle. During this particular time, both SCR 60 and SCR 68 are conducting, but the current from the commutating circuit increases more rapidly than the yoke current $I_2$ so that after a very short time, the net current flowing in SCR 60 reverses to cause SCR 60 to turn off. Because the commutating circuit current momentarily becomes greater than the yoke current, diode 62 becomes forward biased and conducts at this time. However, this conduction occurs only for a short interval, until the commutating circuit current decreases and becomes equal to the yoke current. Diode 62 then again becomes non-conductive, and the retrace interval begins.

During the first half of the retrace interval—with both SCR 60 and diode 62 in the "off" state—the resulting network comprises a series resonant circuit consisting of inductor 74, capacitor 72 and the deflection yoke 66. (Capacitor 64 also is in series with these components but, because of its large value, its effect can be neglected.) Midway through the retrace interval, the current in the series resonant circuit decreases to zero, at which time the current reverses its direction causing SCR 68 to stop conducting as the current is in a direction opposite to the conduction direction of that rectifier. Diode 70 then becomes forward biased to start conducting and thereby complete the circuit for the remainder of the retrace current flow. The energy which had been stored on capacitor 72 during this interval is thus returned to the deflection yoke 66. At the end of the retrace interval, the voltage which has developed across diode 62 is effective to forward bias this component and switch it to its conductive condition. This action effectively disconnects the commutating components 72, 74 from the yoke winding 66, and connects the capacitor 64 across the winding. The yoke energy then discharges into capacitor 64, starting the first half of the trace interval once again.

This complex series of energy exchanges between the reactive components illustrated is more fully detailed in U.S. Pat. No. 3,452,244, the disclosure of which is herein incorporated by reference.

As described in the afore-mentioned pending application Ser. No. 103,713 (RCA 64,214), problems may occur if the trace diode 62 of the drawing fails to be conductive. In particular, with the output transformer 48 having a primary winding *p* coupled across the combination of deflection yoke 66 and capacitor 64 by a further capacitor 67 coupled between its low voltage terminal and ground, and with a high voltage winding *h* providing the voltage pulses to a high voltage multiplier 90, such failure of the trace diode 62 will permit the flyback pulse developed at a conductor 92 to exhibit a peak-to-peak voltage for the high voltage multiplier 90 which will very nearly double the desired value where the diode 62 is operative. As a result, the ultor voltage produced for the cathode-ray kinescope will be undesirably high—such increase in high voltage could very well destroy the phosphors on the kinescope face and could give rise to X-radiation beyond acceptable values.

However, in accordance with the invention of that pending application, a diode 93 and a resistor 94 are serially coupled between the ground return capacitor 67 for the transformer 48 and the junction of resistors 26 and 28 of the horizontal oscillator, to prevent the developed high voltage from rising to an excessive level. That is, when the trace diode 62 is conducting normally, the average direct voltage which develops across capacitor 67 will be in excess of the regulated voltage at terminal A used to supply the horizontal oscillator, and diode 93 will be reverse biased. When the trace diode 62 does not conduct, however, a charging current path does not exist for the current $I_1$ and the average direct voltage developed across capacitor 67 will drop to a value considerably less than the regulated source voltage. If this occurs, the included diode 93 will become forward biased to couple the junction of resistors 26, 28 to this lower voltage point. The time required to charge the oscillator capacitor 36 to the level needed to drive the transistor 12 will thus increase and cause the oscillator frequency to decrease. With the type of deflection circuit illustrated, the decreased frequency of the horizontal oscillator will decrease the frequency of the drive signals supplied by transformer winding 58 to SCR 68, with the overall effect being to decrease the energy supplied to the horizontal deflection yoke and to the primary winding *p* of the transformer 48. The net result will be a decrease in the high voltage applied to the multiplier 90 and a corresponding decrease in the ultor voltage developed. Because the oscillator frequency will be reduced during the occurence of such a diode fault, the reproduced picture will also become unviewable.

The present invention is similar to that disclosed in the Ser. No. 103,713 application in that the frequency of the horizontal oscillator 10 will be changed during a fault condition, to render the reproduced picture unviewable. However, its operation follows the occurence of a fault in the system used to regulate the developed high voltage. For example, in one design of a horizontal deflection circuit of the type disclosed in U.S. Pat. No. 3,452,244, the inductive winding 76 was designed to resonate with the commutating capacitors 72 and 86 at a frequency whose period approached twice the horizontal scanning interval. The specific resonant frequency was made variable by the high voltage regulator circuit employed so that the wave-shape resulting from the resonant action determined the amount of charge that existed on these capacitors when their energy was released into the output circuit.

One manner of accomplishing this is illustrated in the present drawing through the use of a saturable reactor 108 having a load winding 110 coupled in parallel with the transformer winding 76, and by changing the current in the reactor control winding 112 to vary the total inductance presented to the capacitors 72, 86. The control current for the reactor winding 112 is determined by the conduction of an included high voltage regulator transistor 115—having collector and emitter electrodes coupled in series with the winding 112 by means of a resistor 114 returned to a positive potential +B, and a base electrode coupled to the junction of a pair of resistors 118, 120 coupled between the collector electrode and ground. A zener diode 122 serves as a reference voltage coupled between the base electrode of transistor 115 and the arm of a variable resistor 124 coupled in series with resistors 126, 128 between the yoke return capacitor 64 and ground. Also, a resistor 116 is shown as coupling the junction of winding 112 and resistor 114 to ground.

In operation, the voltage developed across the capacitor 64 reflects the changes in high voltage for the circuitry. Such voltage, in turn, controls the conduction of the regulator transistor 115 when it exceeds the zener diode reference voltage. Under conditions of decreasing beam current, for instance, the high voltage developed across capacitor 64 tends to increase, to couple an instantaneously higher current pulse through the base-emitter junction of transistor 115—this increases the control current in reactor winding 112 in a direction to reduce the total inductance presented to capacitors 72, 86 by windings 76, 110. The resulting change in resonance, which results, causes the voltage on capacitor 72 to reduce, to thereby lower the energy made available to the output circuit and thus stabilize the high voltage. Under conditions of increasing beam current, on the other hand, the decreasing high voltage developed across capacitor 64 has the opposite effect—namely, the lower current pulse through the base-emitter junction of transistor 115 decreases the reactor control current, and varies the resonance in a direction to raise the output circuit energy in an offsetting manner. But, just as a failure of the trace diode 62 in the arrangement of the Ser. No. 103,713 application can lead to excessive increases in high voltage, so too can failures in the regulator circuit. Thus, if the transistor 115 should become non-conductive, or should the reactor windings open circuit, the regulation previously afforded to control the amount of energy supplied to the horizontal output circuit will be lost, and the high voltage could increase to an excessive level.

In accordance with the present invention, however, a second protection circuit is included, incorporating a transistor 150 and a zener diode 152. As shown, the collector electrode of transistor 150 is coupled to the junction between resistors 26 and 28 in the horizontal oscillator 10, while a small current limiting resistor 154 couples the emitter electrode of transistor 150 to the zener diode 152 referenced against ground. The base electrode of transistor 150 is coupled to detect high voltage increases by connection to the junction of a pair of resistors 156, 158, with resistor 156 being referenced to ground and with resistor 158 being coupled by means of an additional resistor 160 to either the yoke return capacitor 64 or to the transformer return capacitor 67. A capacitor 162 is coupled across resistor 156 to filter the direct voltage at the base electrode of transistor 150 while a further resistor 164 couples the junction of zener diode 152 with resistor 154 to a third source of energizing potential ($+V_3$).

Under normal operating conditions—and with the values illustrated—the direct voltage developed across the capacitor 64 (or the capacitor 67) will be of a magnitude insufficient to overcome the reference voltage of the zener diode 152, so that transistor 150 will normally be nonconductive. Any increase in high voltage which tends to be produced as the alternating current line voltage varies, for example, will be detected and stabilized by the regulator circuit described above. But, if such regulator action is lost, any line voltage increase which occurs will raise the average direct voltage developed across the return capacitor 64 (or 67) and will place a higher direct voltage at the base electrode of transistor 150. Before the line voltage variation would cause an increase in high voltage to the point at which X-radiation or phosphor destruction could occur, however, the increasing direct voltage at the base electrode would render transistor 150 conductive. This, in turn, would lower its collector electrode voltage coupled to the horizontal oscillator, to again shift the horizontal oscillator off frequency—and to render its picture unviewable as in the previously described trace diode protection network.

Once the zener diode 152 is selected, any choice of values for the components 154–164 can be made to result in a change in oscillator frequency away from the viewable picture frequency. On the other hand, the zener diode 152 is selected according to the value of the regulated voltage at point A. In one design of the circuit, the regulated voltage at point A was selected of the order of 33 volts direct current; operation of the described invention can then be mantained under fault conditions with a zener diode 152 providing a voltage reference from a few volts up to approximately 5 volts or so less than the 30 volt level established at the junction of resistors 26 and 28. Two resistors 158, 160 of equivalent resistance are included in the circuit of the drawing instead of a single resistor for purposes of test; the short circuiting of resistor 158 will result in a higher direct voltage being developed at the base of transistor 150 and will simulate a fault. Transistor 150 should start to conduct and the oscillator frequency should be reduced to produce an unviewable picture.

While there has been described what is considered to be a preferred embodiment of the present invention, it will be apparent that modifications may be made by those skilled in the art without departing from the scope of the teachings disclosed herein. Thus, it will be noted that the invention is also applicable with other types of deflection circuits, as well as with opposite conductivity type transistors with which the horizontal oscillator would be increased in frequency. Similarly, the collector electrode of the protection transistor 150 could be coupled directly to the circuit terminal A, rather than to the junction of resistors 26, 28. Additionally, the filter capacitor 162 can be removed from the base electrode circuit of the transistor 150, and the arrangement can then be designed to operate in like manner on the positive peaks of the applied voltage. This is not as desirable, however, as component values can vary and change the alternating waveform and the point at which transistor conduction could occur.

Also, the circuit can operate in those arrangements in which the horizontal flyback pulse is stepped-up and rectified to form the high voltage, just as with the multiplier circuit illustrated—in such instance, increases in the direct voltage value of the rectified pulse beyond a predetermined level can be used to indicate a failure in the regulator circuitry and bring the present invention into operation. In either arrangement, it will additionally be seen that the instant invention is useful, both together with the trace diode protection arrangement of the Serial No. 103,713 application or independently of such circuit. Both arrangements would cause an uncontrolled loss of horizontal synchronization which would make the picture unviewable during the existence of their respective fault conditions. It will additionally be noted that the circuit of the present invention will operate to produce this control under such faults for those designs where the regulator circuit monitors the average direct voltage across the flyback return capacitor 67, just as where its connection is made to monitor the average direct voltage across the yoke capacitor 64.

What is claimed is:

1. In a television receiver having an image display device, a deflection circuit including an oscillation signal generator and an S-shaping capacitor, and a high voltage circuit including a flyback transformer and a return capacitor therefor responsive to the generation of such oscillation signals to develop the high voltage needed to operate said display device, the combination therewith of:

regulator means coupled to monitor a direct voltage developed across one of said S-shaping and flyback transformer return capacitors as an indicant of said high voltage and to respond to variations in the development thereof to stabilize said high voltage within a given range of operation; and control means also coupled to monitor a direct voltage developed across one of said S-shaping and flyback transformer return capacitors as an indicant of said high voltage and to respond to variations in the development thereof, but to apply a control signal to said oscillation generator substantially only in response to variations in its monitored indicant which arise when said regulator means becomes inoperative to permit said developed high voltage to exceed the upper limit of its stabilized range, said control signal being effective to change the frequency of said oscillation generator in a direction to render the image reproduction of said display device unviewable and to thereby provide a protective alert as to the existence of high voltage problems within said receiver.

2. The combination of claim 1 wherein said control means includes a transistor in a first state of conduction for conditions of its monitored indicant which reflect the development of high voltages within said stabilized range of operation but rendered to a second state of conduction for applying said control signal to said oscillation generator in response to variations in its monitored indicant which reflect an inoperative regulator means permitting the development of high voltages in excess of the upper limit of said range.

3. The combination of claim 2 wherein said regulator means includes a transistor in a first state of conduction for conditions of its monitored indicant which reflect the development of high voltages within said stabilized range of operation but rendered to a second state of conduction for applying control signals to said deflection circuit in response to variations in its monitored indicant which reflect the development of high voltages in excess of the upper limit of said range.

4. The combination of claim 3 wherein said regulator transistor and said control transistor each monitor the direct voltage developed across the S-shaping capacitor of said deflection circuit as indicative of the high voltage generated.

5. The combination of claim 3 wherein said regulator transistor monitors the direct voltage developed across said S-shaping capacitor and wherein said control transistor monitors the direct voltage developed across said flyback transformer return capacitor as indicative of the high voltages developed within said television receiver.

6. The combination of claim 3 wherein said regulator transistor and said control transistor each monitor the direct voltage developed across the flyback transformer return capacitor of said high voltage circuit as indicative of the high voltage generated.

7. The combination of claim 3 wherein said regulator transistor monitors the direct voltage developed across said flyback transformer return capacitor and wherein said control transistor monitors the direct voltage developed across said S-shaping capacitor as indicative of the high voltages developed within said television receiver.

* * * * *